Patented Oct. 12, 1943

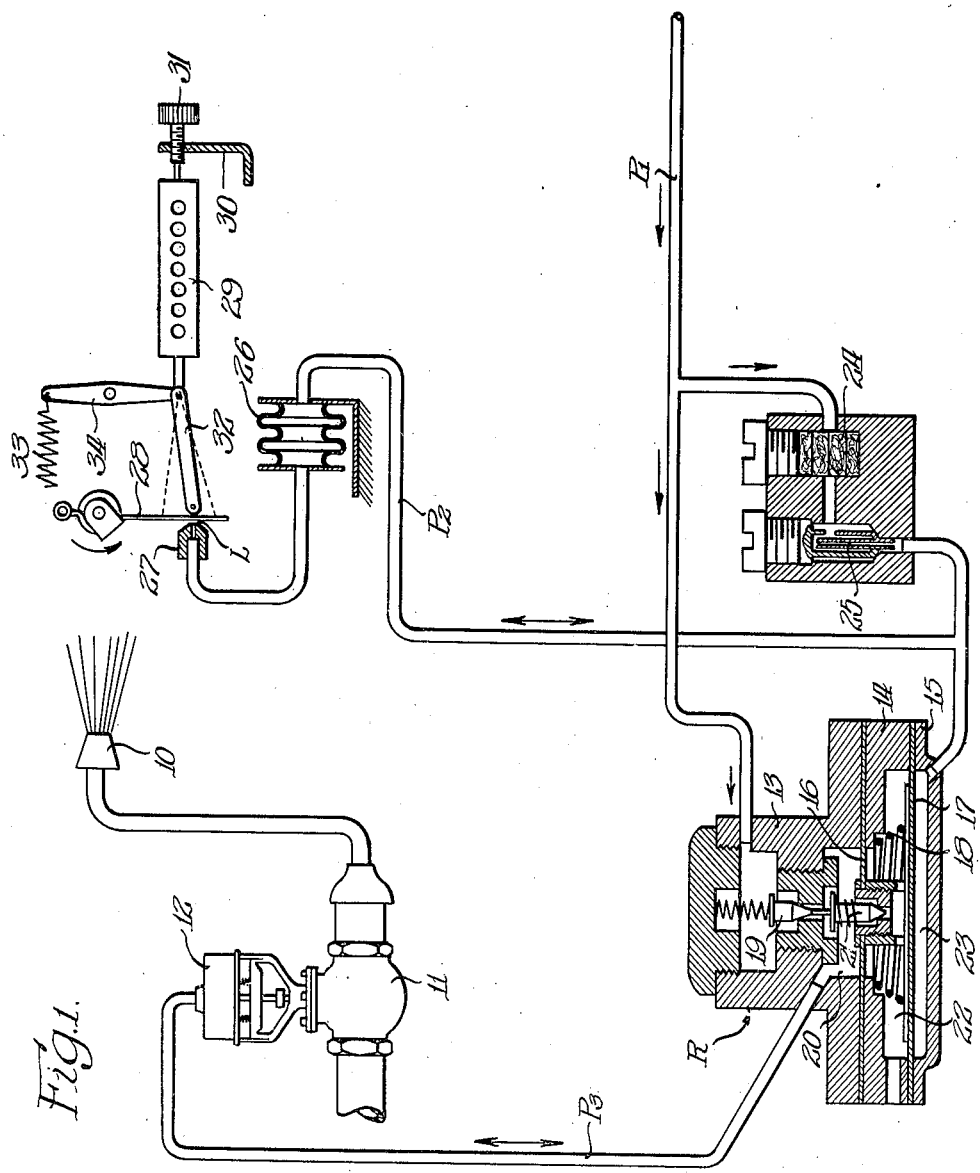

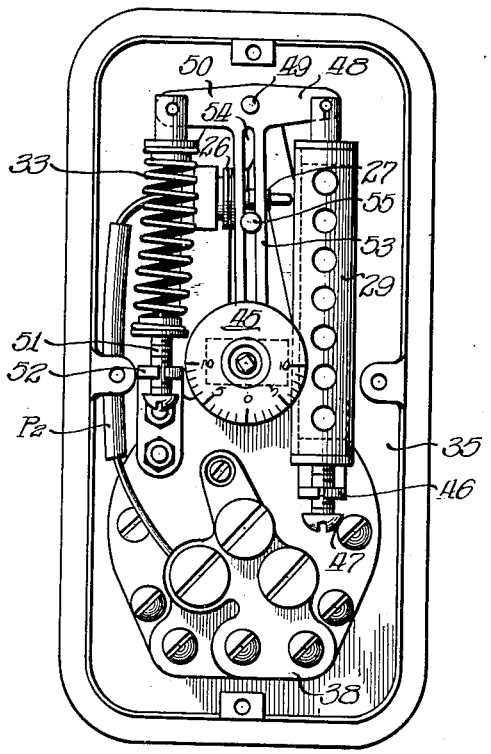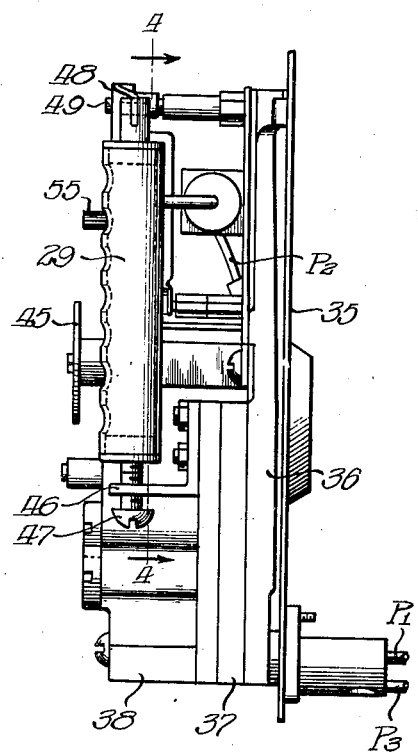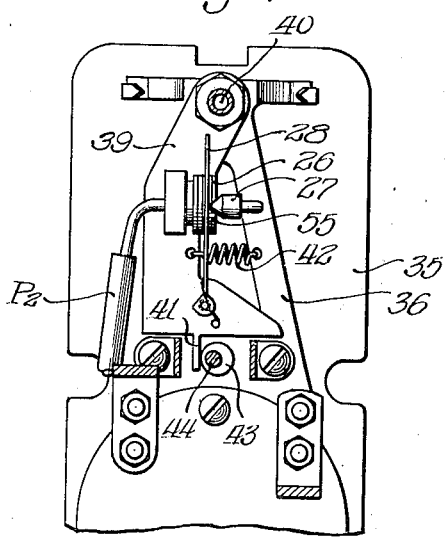

2,331,799

UNITED STATES PATENT OFFICE 2,331,799

MEANS FOR REDUCING THE EFFECT OF FLUCTUATIONS IN SUPPLY PRESSURE TO AIR CONTROLLED INSTRUMENTS

Alfred W. Pett, Glencoe, Ill., assignor to The Powers Regulator Company, Chicago, Ill., a corporation of Illinois Application October 9, 1941, Serial No. 414,306

3 Claims. (Cl. 236—44)

My invention relates to a control device as indicated in the title, and particularly to means of the described character that are associated with an instrument for directly effecting regulation.

While the principle and mechanism disclosed herein are applicable to instruments for controlling temperature, humidity and liquid level or flow, it is discussed herein in connection with a humidostat and will hereinafter be referred to in that relation.

A difficulty experienced in accurate control of humidity is encountered when there are fluctuations in the air supply pressure, such fluctuations being directly reflected in the instrument which controls the delivery of steam or other medium used for humidification.

An object of my invention is to provide means that will very substantially reduce the effect of such fluctuations and, for all practical purposes, to eliminate the effect. The result is accomplished by utilizing elements that have heretofore been used in other relations, combining such elements in a desired manner to produce the result.

The invention will be more readily understood by reference to the accompanying drawings; in which, Fig. 1 is a diagrammatical view showing the arrangement of elements for accomplishing the desired result;

Fig. 2 is a front view of a hygrostat containing the desired arrangement of parts;

Fig. 3 is a side view thereof and,

Fig. 4 is a fragmentary sectional view on the line 4—4 of Fig. 3.

The arrangement of parts as illustrated in the diagrammatic Fig. 1 includes a spray nozzle 10 for steam, the delivery of steam being controlled by a valve 11 operated by an air motor 12. The mechanism being set up for direct action, indicates the valve 11 will be closed by an increase in pressure delivered by the regulating instrument. In a reverse acting set-up the valve will be opened by an increase in such pressure.

Pressure is delivered to the motor 12 by a pipe P—3 connected to a differential relay or relay valve R comprising a three-part casing 13—14—15, a diaphragm 16 being confined between the parts 13—14 and a diaphragm 17 being confined between the parts 14—15. A spring 18, in this instance loaded to one pound pressure per square inch of diaphragm area is disposed against the diaphragm 17.

A pipe P—1 delivers air under pressure from a suitable source, normally maintained at 15 pounds, to the casing 13. A spring seated valve 19 controls the entrance of such pressure to the chamber 20 which is open to the pipe P—3. A projection from the valve 19 engages the spring opened valve 21 which controls a passage from the chamber 20 to the space 22 above the diaphragm 17. A pipe P—2 is open to the space or chamber 23 below the diaphragm 17. It will be noted that the diaphragm 17 has a substantially greater effective area than the diaphragm 16, in this instance the ratio being 6 to 1.

Air from the pipe P—1 is delivered through a filter 24 and a restriction valve 25 to the pipe P—2 thence to a bellows 26 hereinafter referred to as a "hydron" and from the hydron to a nozzle 27. The hydron 26 has a predetermined spring value which opposes the pressure in line $P_2$ and always tends to return to a predetermined position which, for the embodiment shown, is zero pressure. The hydron operates normally at an expanded position due to pressure in line $P_2$. A flapper 28, acting as a valve, is, by reason of its controlling spring, urged away from the nozzle. A moisture sensitive element 29 is adjustably held to a fixed bracket 30 by means of a primary adjusting screw 31. At its opposite end the element 29 has a projecting piece 32 actuated through an arm 34 that contacts the flapper 28, the piece being adjustable to positions between the dotted lines in order to vary the sensitivity of the moisture sensitive element relative to the controlling apparatus. A tension spring 33 tends to retract the moisture-sensitive element.

For the purpose of description and computation the flapper 28 is shown spaced from the nozzle 27, a distance L which, of course, is greatly exaggerated for purpose of illustration.

Broadly stated, the operation of the apparatus that is diagrammatically shown is as follows:

The amount of air passed by the nozzle 27 is exactly the amount of air that will pass the restriction valve 25. With nozzle 27 unrestricted by the valve 28 there is less pressure in chamber 23 than that which will offset the spring loading of the diaphragm 17. This will open the valve 21 and exhaust any pressure in the line P—3. Consequently the valve 11 will be open in a directacting system. Operating, the flapper will be in a position to maintain $P_3$ at a pressure between 0# and 15#. This will hold valve 11 partially open and maintain a constant supply of moisture to the space, thus maintaining the humidity constant. Further assuming for purpose of illustration, an increase in the supply pressure, there will be an increased pressure drop across the restriction 25 which will increase the flow through the restriction. This will increase the pressure P—2 regardless of the instant adjustment of the flapper 28. The increased pressure will expand the hydron 26 and move the nozzle 27 away from the flapper 28, thus lowering the pressure that would otherwise be effective on the relay valve R.

During normal operation of the hygrostat with a predetermined air supply pressure of 15 pounds, the operation is as follows:

On an increase in moisture in the space to be regulated, the flapper 28 will be moved toward closed position by the moisture-sensitive element 29 so that the pressure in pipe P₂ rises. The flapper 28, having once moved to its new position, stays in said new position so long as humidity remains at its new value, i. e. the value necessary to cause the element 29 to move the flapper to the aforementioned new position. Thus pressure will be built up in the hydron 26 and in the chamber 23. The increase in pressure in the hydron will move the nozzle away from the flapper 28 to a new position where the pressure in line P₂ balances the spring force in the bellows in its new position where the bellows will remain so long as the humidity remains at its new value. While there may be a tendency for the device to cycle, it will do so at a very high frequency which in practice does not disturb the pressure-humidity relation, as hereinabove described. However, the increase in pressure in the chamber 23 will first overcome the spring 18, then through the abutting connections of the valves 21—19 will slightly lift the valve 19 and permit supply pressure of air to pass said valve through the chamber 20 where it is exerted against the small diaphragm 16, thus tending to neutralize the opening of the valve 19, thence into the pipe P—3 to the motor 12 where the valve 11 will be correspondingly closed, thus restricting the amount of moisture being projected into the space.

On a lowering of the humidity conditions within the space to be regulated, the moisture-sensitive element will be retracted, thus reducing the pressure within the chamber 23 and permitting retraction of the diaphragm 17 to a point where the valve 19 is closed and the valve 21 is slightly opened, thus permitting the exhaust of air from the pipe P—3 into the atmosphere. This permits the opening of the valve 11 and an increase in the amount of moisture projected into the space.

Specific mechanism arranged for commercial use and combining in one instrument the functions of moisture control and supply pressure control is shown in Figs. 2 to 4 in which the elements corresponding to those shown in the diagrammatic view are given the same numbers.

In said mechanism I provide a back 35 on which the various parts are mounted and which serves to support a cover, not shown. The base 36 supports the castings 37—38 which contain the restriction valve 25 and the differential relay R shown in Fig. 1, together with the various drilled passages to and from these parts. Leading from the relay is the flexible pipe P—2 which communicates with the hydron 26. The hydron, the nozzle 27 and the flapper 28 are mounted on a flat arm 39 pivoted at 40 to the base and having a projection 41 at its lower end. A spring 42 connected to the base 36 and to the arm 39 tend to pull the arm to the right as shown in Fig. 4, against a cam 43 mounted on a shaft 44 surmounted at its outer end by a dial 45. This comprises the operating adjustment device for the instrument, the effect of the adjustment being to move the parts toward or away from the operating element of the moisture-sensitive device.

The moisture-sensitive element 29, in this instance indicated as a cylinder of wood, is supported at its lower end on a bracket 46, a screw 47 constituting means for effecting a rough adjustment. The upper end of the element has a pivotal connection to one arm 48 of a double bell crank which is pivoted at 49, this being the same pivot point as the point 40 on which the arm 39 rotates. Another arm 50 of the bell crank provides a connection for the spring 33, the lower end of which is supported through an adjusting screw 51 on a bracket 52.

Both the brackets 46 and 52 may be reversed in their positions to permit the moisture sensitive element and the spring to be transposed and thereby to change the instrument from direct acting to reverse acting. The only other change necessary in that case will be to rotate the adjusting dial 180° whereupon the parts will function in exactly the same manner.

The third arm 53 of the bell crank is provided with a slot 54 which carries a pin 55, adjustable lengthwise of the slot, the pin extending downwardly and lying against the flapper 28, as best shown in Fig. 4. By changing the position of the pin 55 in the slot, the relative sensitivity of the instrument may be changed. If the pin is located at the upper end of the slot, as shown in Fig. 2, the action will be very gradual while if located in the lower end of the slot, the action will be positive—that is, almost a complete reversal of action with a very slight change in moisture conditions. For example, with a change of 1% in humidity there will be a change of 15 pounds in the valve-actuating pressure.

In the commercial mechanism it will be noted that I have combined in a single instrument an efficient hygrostat and means for minimizing the effect of fluctuations in the supply pressure. This means that while it acts independently of changes in moisture conditions, it operates as a part of the hygrostat itself when there is no need for compensation for varying supply pressure. It would appear unnecessary to repeat what has been fully explained heretofore, and it has been found that without regard to any change in the moisture conditions of the space, the instrument will, by reason of the mechanism shown, adjust itself to changes in supply pressure. The adjustment that occurs following a change in supply pressure does not interfere with the functional relation of the moisture-sensitive element and the throttle, and further, with the herein contemplated invention, the greater the movement of the nozzle 27, the less the effect of supply pressure variations.

The normal operation of the commercial mechanism for moisture control will be apparent in view of the description of the operation in connection with the diagram. It will be well, however, to say that upon an increase in moisture conditions in the space, the element 29 will be elongated, causing the bell crank to rock in a counterclockwise direction. This will cause the pin 55 to move toward the right as viewed in Figure 2, permitting the spring 42 to move the arm 39 and consequently the flapper toward the nozzle 27 and restrict its outlet. The increase in pressure in the line P—2, however, will result in the expansion of the bellows 26 which will tend to move the nozzle away from the flapper. Bodily movement of the plate 39 carrying the nozzle and the flapper is effected for adjustment purposes by rotation of the dial and consequently the cam 43.

With existing devices which do not utilize my improvement the change following a change of one pound pressure in the supply line has been found to be 1.16 pounds at the control valve. With a device as contemplated herein utilizing my improvement the change effective at the control valve following a similar change in supply line pressure is .330 pound.

As previously stated, the invention is not limited to use in connection with humidity regulators and it is obvious that numerous variations may be made in the apparatus shown without departure from the spirit of my invention.

I claim:

1. In mechanism for regulating humidity, the combination of a conduit for a supply of air under pressure, a restriction valve therein, a bleed nozzle in the conduit past said restriction, a pressure expansible element having a predetermined neutral position adapted to move the nozzle in direct relation to the degree of pressure in said conduit past the restriction, a closure for said nozzle, means actuated by humidity for positioning said closure, and a differential relay connected to said conduit, past the restriction, to a source of air under pressure and to means for effecting the controlled humidity.

2. In a hygrostat, means for reducing the effect of fluctuations in air supply pressure, comprising a conduit connected to a source of air under pressure, a restriction in said conduit, a bleed nozzle in the conduit past said restriction, a flapper valve associated with said nozzle, a moisture-sensitive element operatively associated with said flapper to control the position thereof with respect to said nozzle, means for varying the ratio of movement of the element relative to the valve, a hydron in said conduit past said restriction, said hydron controlling the position of the nozzle relative to the flapper by reason of variations of pressure in the conduit, a relay, a conduit connecting the relay to that portion of the first mentioned conduit between the restriction and the nozzle, a conduit connecting the relay to said source of air under pressure, a valve-controlled moisture outlet, and a conduit from the relay to the valve for said moisture outlet.

3. In a hygrostat, means for reducing the effect of fluctuations in air supply pressure, comprising a conduit connected to a source of air under pressure, a restriction in said conduit, a bleed nozzle in the conduit past said restriction, a flapper valve associated with said nozzle, a moisture-sensitive element operatively associated with said flapper to control the position thereof with respect to said nozzle, means for varying the ratio of movement of the element relative to the valve, a hydron in said conduit past said restriction, said hydron controlling the position of the nozzle relative to the flapper by reason of variations of pressure in the conduit, a differential relay, a conduit connecting the relay to that portion of the first mentioned conduit between the restriction and the nozzle, a conduit connecting the relay to said source of air under pressure, a valve-controlled moisture outlet, and a conduit from the relay to the valve for said moisture outlet.

ALFRED W. PETT.